April 6, 1954
S. O. CLEMENTS
2,674,014
VEHICLE STORAGE STRUCTURE
Filed July 17, 1950
3 Sheets-Sheet 3
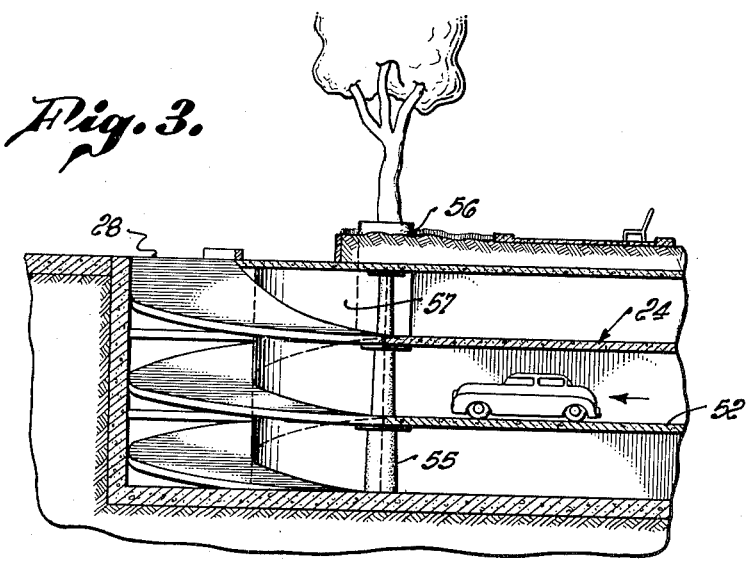
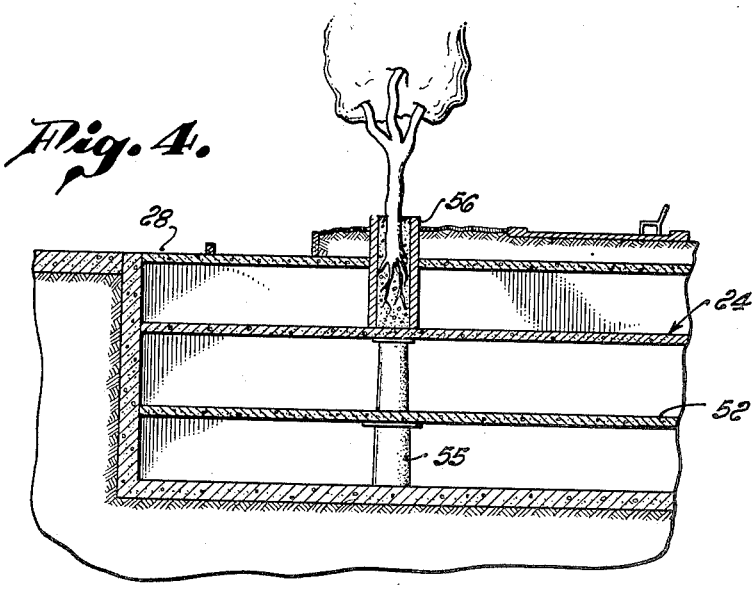
Stiles O. Clements,
INVENTOR.
BY
Attorney.

Patented Apr. 6, 1954

2,674,014

UNITED STATES PATENT OFFICE 2,674,014

VEHICLE STORAGE STRUCTURE

Stiles O. Clements, Beverly Hills, Calif.

Application July 17, 1950, Serial No. 174,179

6 Claims. (Cl. 20—1.13)

This invention relates to a vehicle storage structure and is particularly directed to a structure capable of receiving vehicles from a stream of traffic passing the structure and to discharge such vehicles into the same stream without interfering with the movement of such stream. Moreover, the present invention is directed to a vehicle storage structure including storage floors below grade.

The storage of vehicles, particularly automobiles, in congested urban business centers is a problem which has confronted numerous architects, city planners, etc. In most communities there are shopping and business areas which receive thousands of vehicles every day, large numbers of such vehicles being driven to such business area by the employees and business men having work in such area. In addition, the various visitors, customers and shoppers who attempt to conduct their business in such area during the central portion of the day find it difficult to park their vehicles. It is essential therefore that provision be made in all communities for the purpose of storing vehicles utilized both by the residents of such area and the visitors to such area.

Multi-story vehicle storage buildings have been built in many cities but the costs of construction are excessive and only a few of such multi-story vehicle storage structures have been financially successful. Moreover, a great deal of time is consumed in entering such a building and in leaving such a building. In most instances, the entrances and exits are crowded and an insufficient receiving area is provided so that traffic on the thoroughfare leading to the building is very often blocked or impeded in its flow past such building.

The present invention is particularly directed to an arrangement of entrances and exits whereby large numbers of vehicles may enter the structure in a virtually constant stream and, simultaneously therewith, large numbers of vehicles may leave such a structure, both operations taking place without impeding the normal flow of traffic past the structure. The novel arrangement of entrances and exits described in greater detail hereinafter is applicable to multi-story buildings or structures, but in its preferred form this invention pertains to a garage or vehicle storage structure which includes entrances and exits at grade level and below-grade storage floors. Most cities include squares or parks and the space beneath such squares, parks, or open breathing spaces is particularly well adapted as a location for the vehicle storage structures of this invention. It is to be understood that one or more below-grade floors for the storage of vehicles may be provided. Since such parks are relatively extensive, a great number of cars may be stored on one or two below-grade floors, without detracting from the aesthetic attributes of the park.

This invention therefore is particularly directed to a vehicle storage structure including an arrangement of entrances and exits which permit large numbers of vehicles to be accommodated without interference with the normal flow of traffic past such structure.

A further object of the invention is to disclose and provide a novel vehicle storage structure including entrances and exits at grade level and below-grade floors, such subterranean floors being uniformly horizontal.

Again an object of the present invention is to disclose and provide a vehicle storage structure which includes ramps or entrance and exit runways which are angularly related with respect to the wall of the structure and which extend inwardly from the walls, the exits being above the walls so as to tangentially and gradually merge the outgoing vehicles into the stream of traffic flowing past the structure.

These and various other objects and advantages of the present invention will become apparent to those skilled in the art from the following illustrative example, it being understood that the invention is not limited to the specific example given but embraces various modifications and adaptations which will readily occur to those skilled in the art.

In the drawings:

Fig. 3 is a vertical section taken along the plane III—III in Fig. 1.

Fig. 4 is another vertical section taken along the plane IV—IV in Fig. 1.

Figure 1:
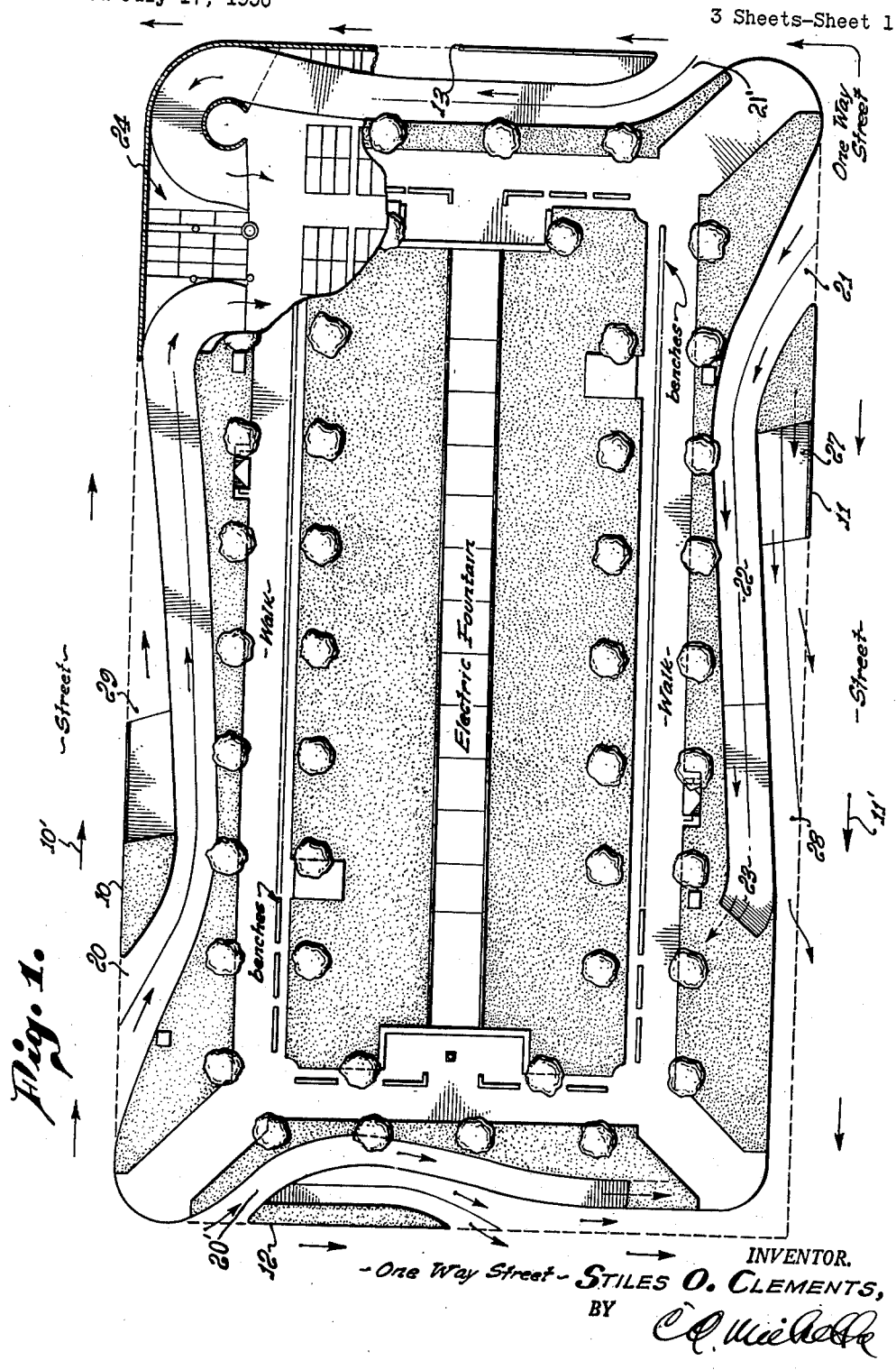
Fig. 1 is a plan view of a city square or park showing the arrangement of exits and entrances from and into the subterranean vehicle storage structure. A portion of the surface covering has been broken away to indicate one of the ramps.

In the drawings the vehicle storage structure is shown having entrances and exits at grade level, that is, at street level, and below-grade floors. The structure itself is defined by its walls which establish its horizontal limits.

These vertical walls are indicated at 10, 11, 12 and 13 and may follow the curb lines when the structure is to completely underlie a city park or square. It may also be assumed that the general flow of traffic on adjoining thoroughfares, is in the direction of the arrow 10' parallel to the direction of the wall 10, whereas traffic flows in the direction of the arrow 11' parallel to the wall or limit 11 of the structure.

Figure 2:
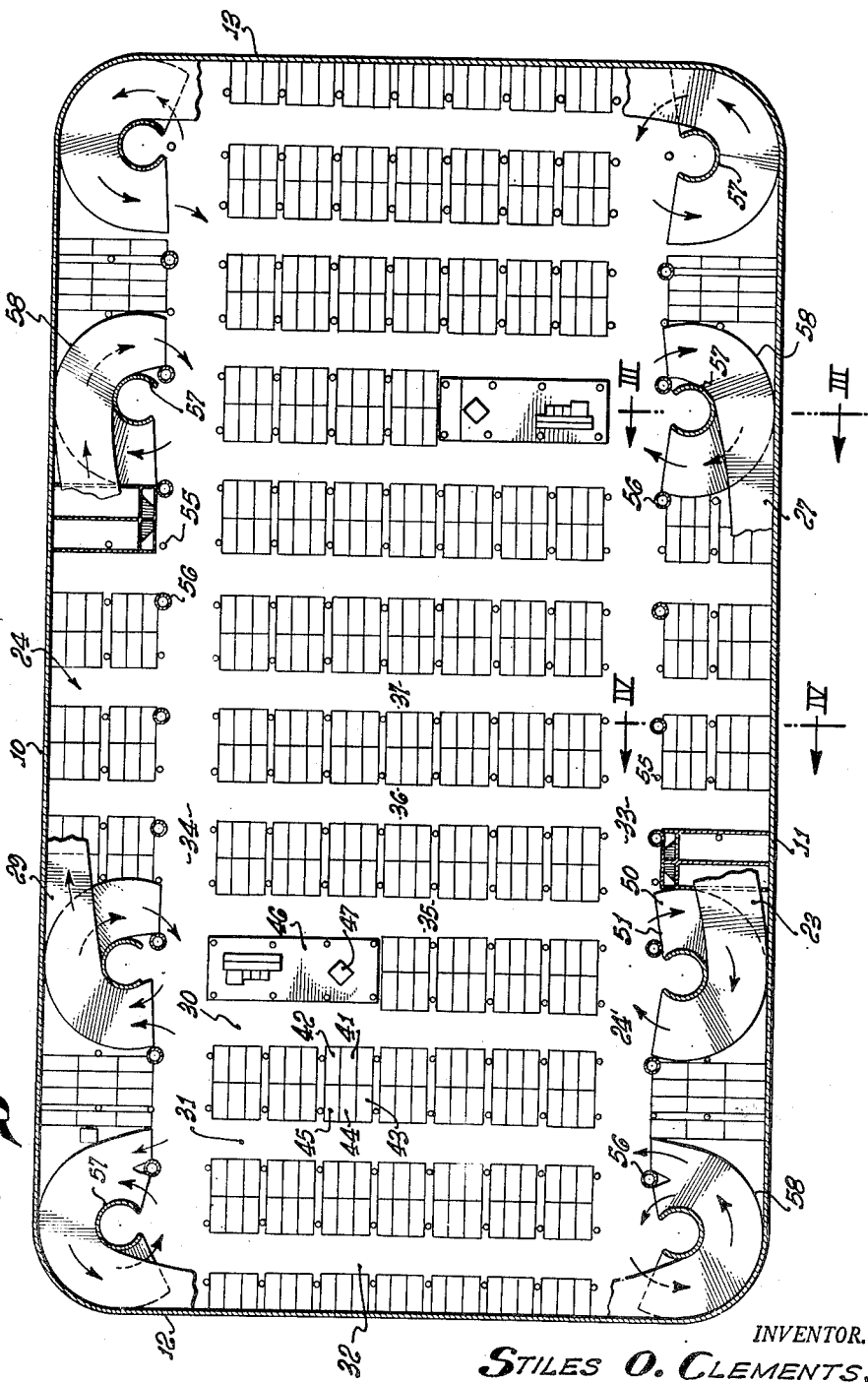
Fig. 2 is a plan view of the first sub-floor showing the ramps and the manner in which vehicles may be stored.

As previously stated it is highly desirable to receive traffic from one of the flowing streams and to discharge vehicles from the storage structure into such stream without blocking the traffic along the street and without impairing its normal flow. In order to accomplish this highly desirable result, the design of the present invention employs entrances such as the entrance runways 20 and 21 which extend inwardly from the curb line, structure wall line, or from the flow of traffic at a gradual or relatively small angle of between about 15° and 35°. It will be noted, for example, that the entrance ramp portion 21 extends from the street at an angle of about 17° and such entrance portion 21 is of a generally arcuate form including the upper leg or entrance leg extending from the street inwardly to above and within the limits of the structure and a middle leg portion 22 which is at grade level (as is the leg portion 21). Such entrance ramp or runway then merges into a lower portion 23 of generally helical configuration adjacent the wall 11 of the structure and in communication with the below-grade floor 24, as best shown in Fig. 2. In this manner it will be noted that a considerable length of entrance, comprising the upper entrance portions 21 and 22, are at grade level. The portion 22 is within the limits of the structure, however, and therefore all the vehicles which are either standing or slowly progressing along the entrance ramp to the helical portion 23 are out of the flow of traffic along the thoroughfare indicated by the arrow 11'. No sharp deviation or turn is necessary to move from such stream of traffic into the entrance 21 and, as previously indicated, the axes of such entrance portion 21 is at an angle of between about 15° and 35° to the wall 11 of the structure which parallels the thoroughfare and stream of traffic thereon. Moreover, it is to be noted that the lowermost portion of such entrance ramp, comprising the helical portion 23 is adjacent the wall 11 of the structure permitting vehicles to move from a position adjacent the wall of the structure down any one of the numerous passageways on the below-grade storage floor 24. Such passageways are indicated at 30, 31, 32, 33, 34, 35, 36, 37, etc. It is to be noted that although the entire structure is rectangular in plan, at least one of the corners is provided with a pair of entrance ramps, the upper entrance portions of such ramps being in proximity to such corner as indicated by the entrance portions 20 and 20'. The middle legs of said entrance ramps originating at such corner extend in directions of at least 90° to each other.

The entrances are on the upstream side of the flow of traffic, with respect to the exits. This relationship is best observed by noting that the exit ramp comprises a lower section of generally helical configuration, indicated at 26, positioned adjacent the wall 11 of the structure, an upwardly directed intermediate portion, indicated at 27, and an upper, horizontally disposed continuation at grade level, indicated at 28, this continuation having its axis at an angle of not over 15° to the wall 11 of the structure and extending in part above the wall 11 and lying in part within the limits of the structure, if such limits were upwardly extended above grade level. It will be noted, therefore, that the vehicles being discharged from the structure rapidly reach grade level and are provided with numerous opportunities of leaving the continuation 28 and merging into the flow of traffic passing in the direction of the arrow 11', since such extension 28 is of appreciable length and, if necessary, provides space upon which the vehicles may stand while waiting for a change in traffic control lights or the like.

It may also be noted that the entrance ramp and particularly the upper entrance portion thereof crosses the lower section of the exit ramp and the portion 22 of the entrance ramp is substantially parallel to the portions 27 and 28 of the exit ramp. Incoming and outgoing vehicles are therefore traveling in substantially the same direction when viewed in plan as in Fig. 1.

Although entrance 21 and exit 28 have been described in considerable detail, the other entrances and exits, such as the entrance 20 and exit 29 are similarly arranged. Another set of similar entrances and exits may be provided along the limits of the structure defined by the walls 12 and 13. Certain of the exits may be capable of taking two vehicles abreast whereas others may only accommodate a single line of vehicles. The width of the entrance and exit ramps and their location on the various sides of the structure may be varied in accordance with the traffic pattern established by the greatest number of vehicles utilizing the thoroughfares surrounding the structure.

The entire area of the horizontal below-grade storage floor 24 may be subdivided into stalls such as the stalls 40, 41 and 42 facing the passageway 30 and the stalls 43, 44 and 45 facing the passageway 31. Waiting islands such as 46 may be provided and equipped with suitable cashiers' and checkers' positions 47, such islands 46 being preferably located between the lowermost section of an entrance ramp and the lowermost section of an exit ramp on the opposite side of the structure.

It is to be understood that the invention is not limited to the use of but a single sub-floor 24 since other sub-floors may be in communication with the various ramps for the purpose of permitting vehicles to travel downwardly from one below-grade floor to another and to travel upwardly on the way to the exit ramps. For example, the lowermost portion 23 of the entrance ramp, communicating with the below-grade floor 24 at the line 23' may be symmetrically arranged with respect to a downwardly directed ramp 50 of generally helical form starting at the line 51 where it leaves floor 24 and going downwardly to a lower floor indicated in Fig. 4 at 52.

Each of the below-grade or sub-floors is uniformly flat and in a single plane, and is preferably of thin flat slab reinforced concrete, supported upon columns 55 (spaced 26 to 28 feet) provided with unconventional heads in the form of dropped, splayed head panels the head panels comprising about 25% of the total ceiling area. Certain of the columns are hollow or the tops thereof (between ground level and first subfloor) are provided with wells which can be filled with earth and furnish deep recesses or receptacles for roots of trees planted axially of such columns, thereby permitting reduction in the average thickness of soil on the structure while allowing localized deep soil pockets for trees in the park. Such tree wells are indicated at 56 in Fig. 2.

Inner walls 57 of the ramps may have a diameter of about 24 to 27 feet while the outer walls 58 may have a diameter of 78 to 84 feet, thereby providing a ramp of easy grade (about 9% average grade) and of a width affording adequate clearance. These walls 57 and 58 are preferably load bearing. Escalators, elevators, mechanical ventilating equipment and ducts, rest rooms etc. are provided, some of these facilities being positioned within the enclosures formed by the inner walls of the ramps. The arrangement of ramps, exits and entrances permits sub-division of a floor into sections which are readily serviced by operators, and it is to be noted that it is unnecessary for vehicles to pass each other, going in opposite directions, upon a ramp. The central portion of each floor is free from ramps.

It will be evident that the arrangement disclosed herein has numerous advantages over prior constructions. All modifications and changes coming within the appended claims are embraced thereby.

I claim:

1. A vehicle storage structure including an entrance and exit grade level, below-grade floor and limits defined by walls of the structure comprising: an exit ramp having a lower section of generally helical configuration extending upwardly from the below-grade storage floor adjacent the wall of the structure, and an upper horizontally disposed continuation at grade level, said continuation being substantially straight and having an axis converging at an angle of not over 15° to the plane of the wall of the structure and extending in part above said wall and in part within the limits of the structure; an entrance ramp including an upper entrance portion of generally arcuate plan form at grade level and having an entrance leg extending inwardly at an angle of between about 15° and 35° to the wall of the structure and a middle leg virtually parallel to the continuation of the exit ramp, and a lower portion of generally helical configuration adjacent the wall of the structure and in communication with the below-grade floor; the upper entrance portion crossing the lower section of the exit ramp to receive vehicles from a unidirectional traffic stream passing the structure, while the continuation of the exit ramp is arranged to discharge vehicles on the downstream side of the entrance portion and at a plurality of points into said traffic stream without material alteration in the direction of travel of vehicles on said exit ramp continuation.

2. A structure of the character stated in claim 1 wherein the lower ramp sections of generally helical configuration include inner and outer load bearing walls.

3. A structure of the character stated in claim 1 wherein the first below-grade floor is provided with a ceiling supported by columns, a portion at least of said columns being provided with hollow upper portions having open upper ends, said hollow upper ends being filled with earth adapted to support growth of trees planted therein.

4. A structure of the character stated in claim 1 wherein each below-grade floor is provided along one wall with an up going ramp and a down coming ramp, and an up going ramp and a down coming ramp along an opposite wall, the space between said oppositely disposed ramps being free from vehicle ramps, the up going ramp along one wall being located transversely of the structure from the down coming ramp along the opposite wall.

5. A vehicle storage structure including an entrance and exit at grade level, below-grade floor and walls defining generally rectangular limits of the structure, comprising: a pair of entrance ramps originating in a pair of adjacent angularly diverging upper entrance portions near grade level at a corner of the structure, each of said upper entrance portions being arcuate in form; each of said upper entrance portions including a substantially straight middle leg, said middle legs extending in directions of about 90° to each other, each of said entrance ramps terminating in a helical portion in communication with a middle leg thereof and a below-grade floor; and a pair of exit ramps, each including a lower helical section in communication with a below-grade floor, and an upper substantially straight continuation which is horizontal at grade level, the upper continuations being substantially parallel to and adjacent to the middle legs of the entrance ramps, the upper continuations of said exit ramps at grade level being in part above said wall and in part within the limits of the structure and discharging from the structure on the downstream side of an upper entrance ramp portion, whereby each upper entrance ramp portion may receive vehicles from a uni-directional traffic stream flowing past said corner and a discharge ramp may discharge vehicles on the downstream side from said upper entrance ramp portion and at a plurality of points into the traffic stream without material alteration in the direction of travel of vehicles on the upper continuation of the discharge ramp.

6. A vehicle storage structure of the character stated in claim 5 wherein the upper entrance portion of each entrance ramp crosses above the lower section of an exit ramp.

References Cited in the file of this patent

UNITED STATES PATENTS

| Number | Name | Date |
|---|---|---|
| 1,658,373 | Diehl | Feb. 7, 1928 |
| 1,682,679 | Lawton | Aug. 28, 1928 |

OTHER REFERENCES

Roads and Streets, April 1940, page 48.

The Architectural Record, February 1931, page 162.